US011057272B2

(12) United States Patent
Parkinson et al.

(10) Patent No.: US 11,057,272 B2
(45) Date of Patent: Jul. 6, 2021

(54) SYSTEM AND METHOD FOR TRANSACTIONS IN A MULTITENANT APPLICATION SERVER ENVIRONMENT

(71) Applicant: Oracle International Corporation, Redwood Shores, CA (US)

(72) Inventors: Paul Parkinson, Orlando, FL (US); Hiromu Kato, San Francisco, CA (US); Arjav Desai, Mount Laurel, NJ (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 456 days.

(21) Appl. No.: 14/866,631

(22) Filed: Sep. 25, 2015

(65) Prior Publication Data

US 2016/0094407 A1 Mar. 31, 2016

Related U.S. Application Data

(60) Provisional application No. 62/056,435, filed on Sep. 26, 2014.

(51) Int. Cl.
*H04L 12/24* (2006.01)
*H04L 29/08* (2006.01)

(52) U.S. Cl.
CPC ...... *H04L 41/0843* (2013.01); *H04L 41/0893* (2013.01); *H04L 41/12* (2013.01);
(Continued)

(58) Field of Classification Search
CPC . H04L 41/0843; H04L 41/0893; H04L 41/12; H04L 67/1004; H04L 41/0863; H04L 67/22
See application file for complete search history.

(56) References Cited

U.S. PATENT DOCUMENTS

| 9,271,142 B1* | 2/2016 | Broch ............... H04W 12/088 |
| 2009/0089410 A1* | 4/2009 | Vicente ............ G06F 9/45533 709/223 |

(Continued)

FOREIGN PATENT DOCUMENTS

| CN | 101639835 | 2/2010 |
| CN | 102170457 | 8/2011 |

(Continued)

OTHER PUBLICATIONS

Chinese Patent Office, Office Action dated Jul. 20, 2018 for Application No. 201580003512.6, 8 pages.

(Continued)

*Primary Examiner* — Tonia L Dollinger
*Assistant Examiner* — Jihad K Boustany
(74) *Attorney, Agent, or Firm* — Tucker Ellis LLP

(57) ABSTRACT

In accordance with an embodiment, described herein is a system and method for transaction support in a multitenant application server environment. A system can provide for transaction support via a transaction manager. The transaction manager can be associated with one or more objects, including a configuration object and a runtime object. The configuration object can allow for a partition administrator to override globally-set parameters for transactions, including transaction timeout time. The runtime object can allow for a partition administrator to monitor partition-scoped transaction statistics. Furthermore, the transaction manager can additionally account for resource group migration within the multitenant application server environment.

20 Claims, 11 Drawing Sheets

(52) U.S. Cl.
CPC ...... *H04L 67/1004* (2013.01); *H04L 41/0863* (2013.01); *H04L 67/22* (2013.01)

(56) References Cited

U.S. PATENT DOCUMENTS

| | | | |
|---|---|---|---|
| 2010/0274910 A1* | 10/2010 | Ghanaie-Sichanie | ........................ H04L 9/3234 709/229 |
| 2011/0041006 A1* | 2/2011 | Fowler | .................... G06F 9/466 714/10 |
| 2011/0213870 A1 | 9/2011 | Cai et al. | |
| 2012/0072597 A1 | 3/2012 | Teather et al. | |
| 2012/0102006 A1* | 4/2012 | Larson | .................. G06F 16/951 707/703 |
| 2013/0191924 A1* | 7/2013 | Tedesco | .................. G06F 21/00 726/26 |
| 2014/0033268 A1* | 1/2014 | Julisch | .................... H04L 63/20 726/1 |
| 2014/0107855 A1* | 4/2014 | Zhang | .................... H04L 12/12 700/297 |
| 2014/0282519 A1* | 9/2014 | Apte | .................. G06F 9/45533 718/1 |
| 2015/0032884 A1* | 1/2015 | Greifeneder | ............ H04L 67/10 709/224 |
| 2015/0207758 A1 | 7/2015 | Mordani et al. | |
| 2015/0370549 A1 | 12/2015 | Zhang et al. | |
| 2015/0370608 A1 | 12/2015 | Dipol et al. | |
| 2015/0372883 A1 | 12/2015 | Lam et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0373117 A1 | 12/2015 | Gleyzer et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1 | 1/2016 | Thyagarajan et al. | |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094405 A1 | 3/2016 | Barnes et al. | |
| 2016/0094406 A1 | 3/2016 | Phan et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094478 A1 | 3/2016 | Quinn et al. | |
| 2016/0094484 A1 | 3/2016 | Mordani et al. | |
| 2016/0094486 A1 | 3/2016 | Sahoo et al. | |
| 2016/0094498 A1 | 3/2016 | Xiao et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1 | 3/2016 | Mordani et al. | |
| 2016/0094625 A1 | 3/2016 | Sengodan et al. | |
| 2016/0094626 A1 | 3/2016 | Bajaj et al. | |
| 2016/0094627 A1 | 3/2016 | Subramanyam et al. | |
| 2016/0094635 A1 | 3/2016 | Kannan et al. | |
| 2016/0094647 A1 | 3/2016 | Mordani et al. | |
| 2016/0142506 A1 | 5/2016 | Sahoo et al. | |
| 2016/0231998 A1 | 8/2016 | Islam et al. | |
| 2016/0328268 A1 | 11/2016 | Islam et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0192772 A1 | 7/2017 | Islam et al. | |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |

OTHER PUBLICATIONS

Communication pursuant to Article 94(3) EPC, dated Apr. 23, 2019 for EP Application No. 15704133.6, 4 pages.
United States Patent and Trademark Office, Notice of Allowance dated August 9, 2019 for U.S. Appl. No. 15/948,721, 18 pages.
United States Patent and Trademark Office, Notice of Allowance dated Dec. 16, 2019 for U.S. Appl. No. 15/948,721, 18 pages.
United States Patent and Trademark Office, Notice of Allowance dated Mar. 27, 2020 for U.S. Appl. No. 15/948,721, 18 pages.
Kuhn, Darl; "Pro Oracle Database 12c Administration; Chapter 23: Pluggable Databases", Jul. 3, 2013, pp. 667-697, 30 pages.
Indian Patent Office, First Examination Report dated Jun. 22, 2020 for Indian Patent Application No. 201647017709, 6 pages.
European Patent Office, Communication pursuant to Article 94(3) EPC dated Aug. 12, 2020 for EP Application No. 15704133.6, 8 pages.
Korean Patent Office, Office Action dated Oct. 20, 2020 for Korean Patent Application No. 10-2016-7022203, 6 pages.

* cited by examiner

SYSTEM AND METHOD FOR TRANSACTIONS IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR TRANSACTIONS IN A MULTITENANT APPLICATION SERVER ENVIRONMENT", Application No. 62/056,435, filed Sep. 26, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for transaction support in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant.

SUMMARY

In accordance with an embodiment, described herein is a system and method for transaction support in a multitenant application server environment. A system can provide for transaction support via a transaction manager. The transaction manager can be associated with one or more objects, including a configuration object and a runtime object. The configuration object can allow for a partition administrator to override globally-set parameters for transactions, including transaction timeout time. The runtime object can allow for a partition administrator to monitor partition-scoped transaction statistics. Furthermore, the transaction manager can additionally account for resource group migration within the multitenant application server environment.

DETAILED DESCRIPTION

In accordance with an embodiment, described herein is a system and method for transaction support in a multitenant application server environment. A system can provide for transaction support via a transaction manager. The transaction manager can be associated with one or more objects, including a configuration object and a runtime object. The configuration object can allow for a partition administrator to override globally-set parameters for transactions, including transaction timeout time. The runtime object can allow for a partition administrator to monitor partition-scoped transaction statistics. Furthermore, the transaction manager can additionally account for resource group migration within the multitenant application server environment.

Application Server (e.g., Multi-Tenant, MT) Environment

Figure 1:
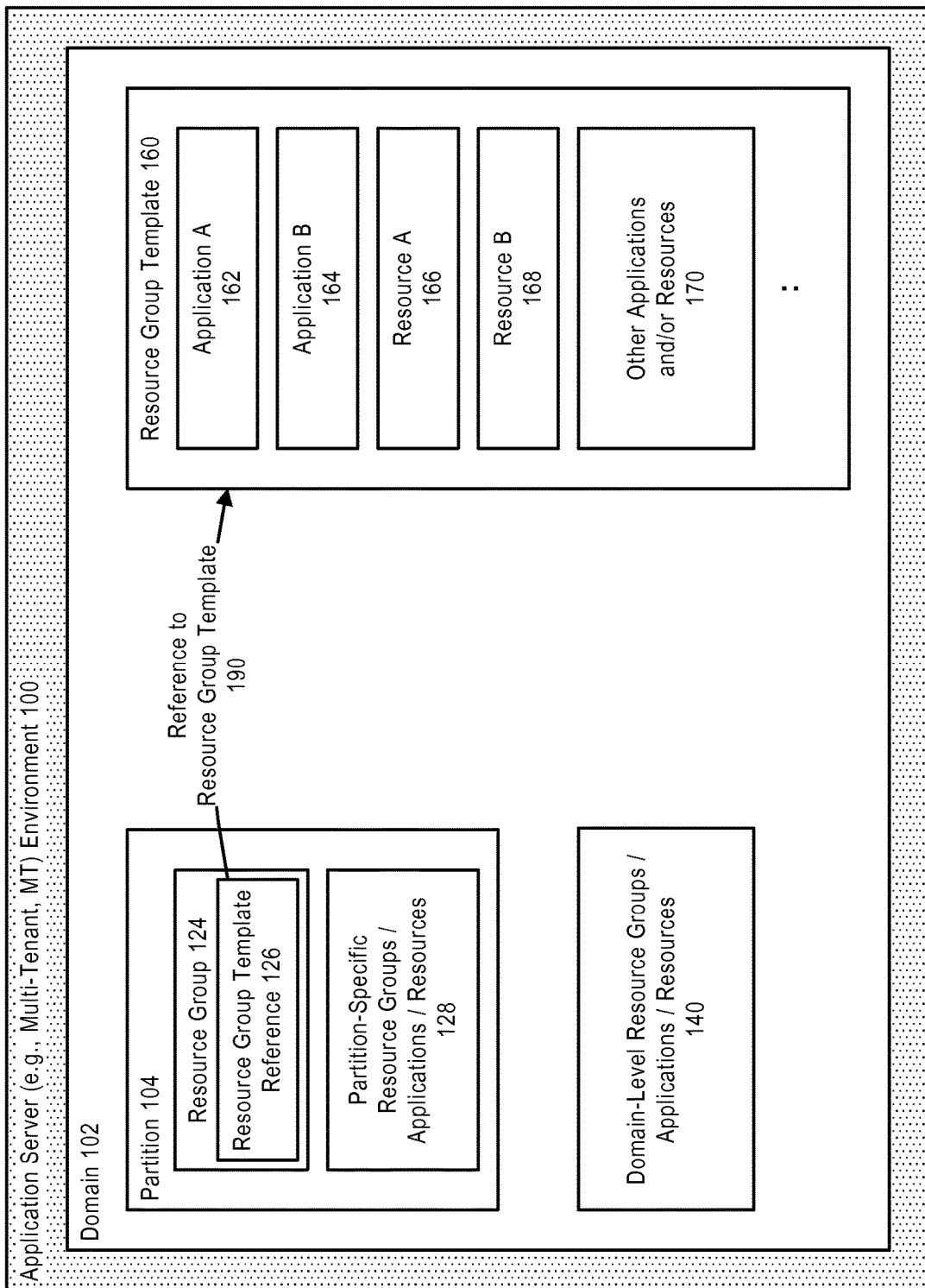
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
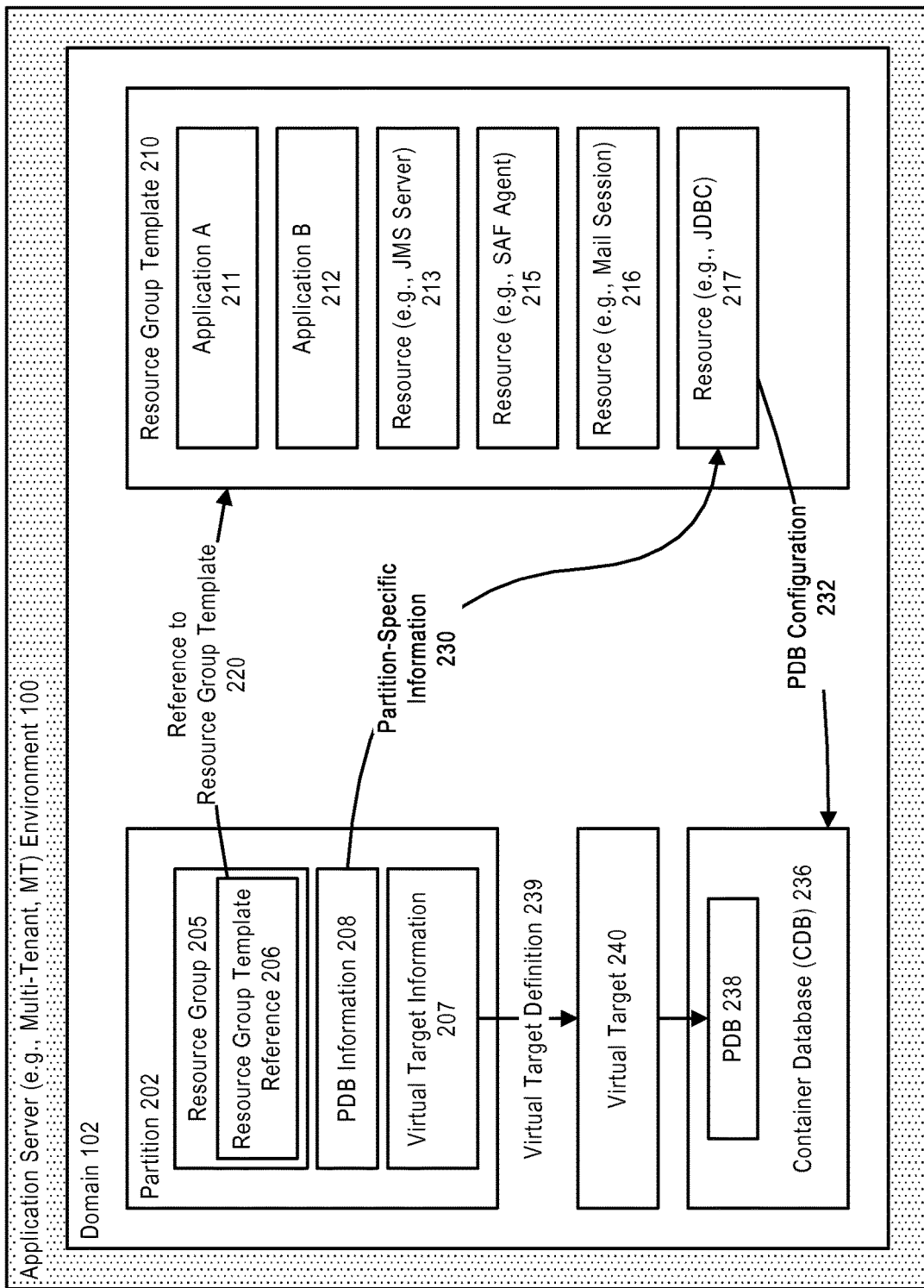
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
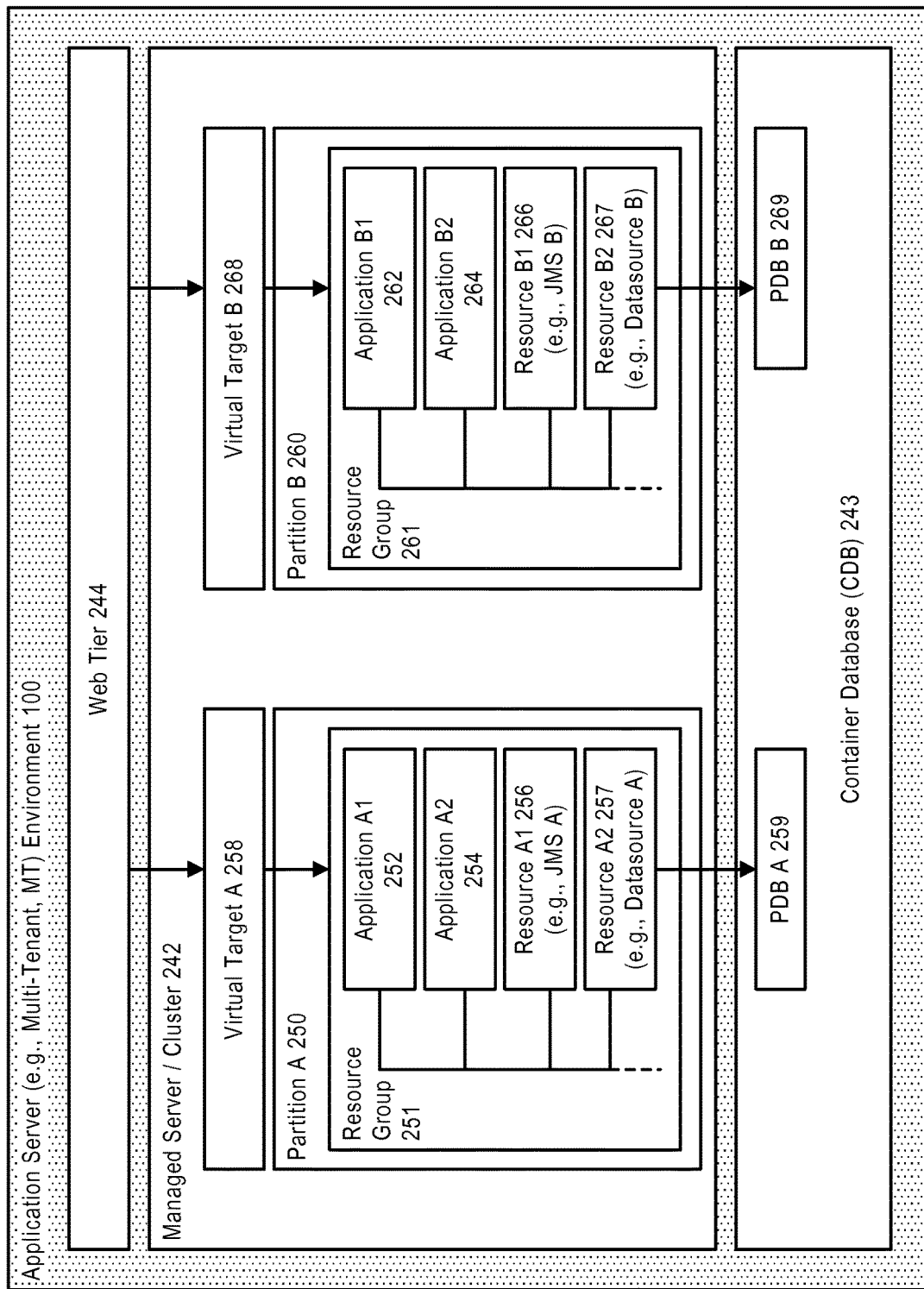
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
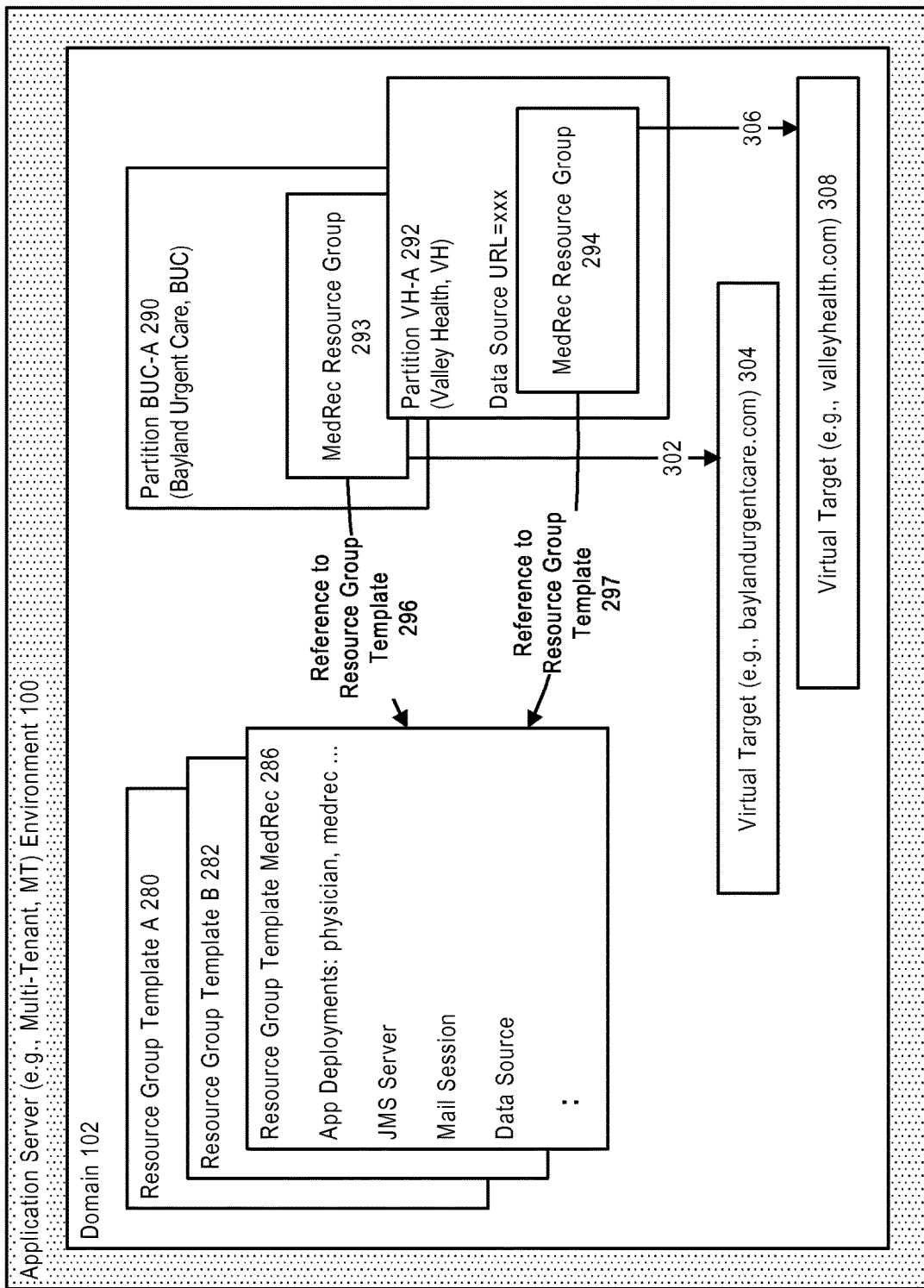
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
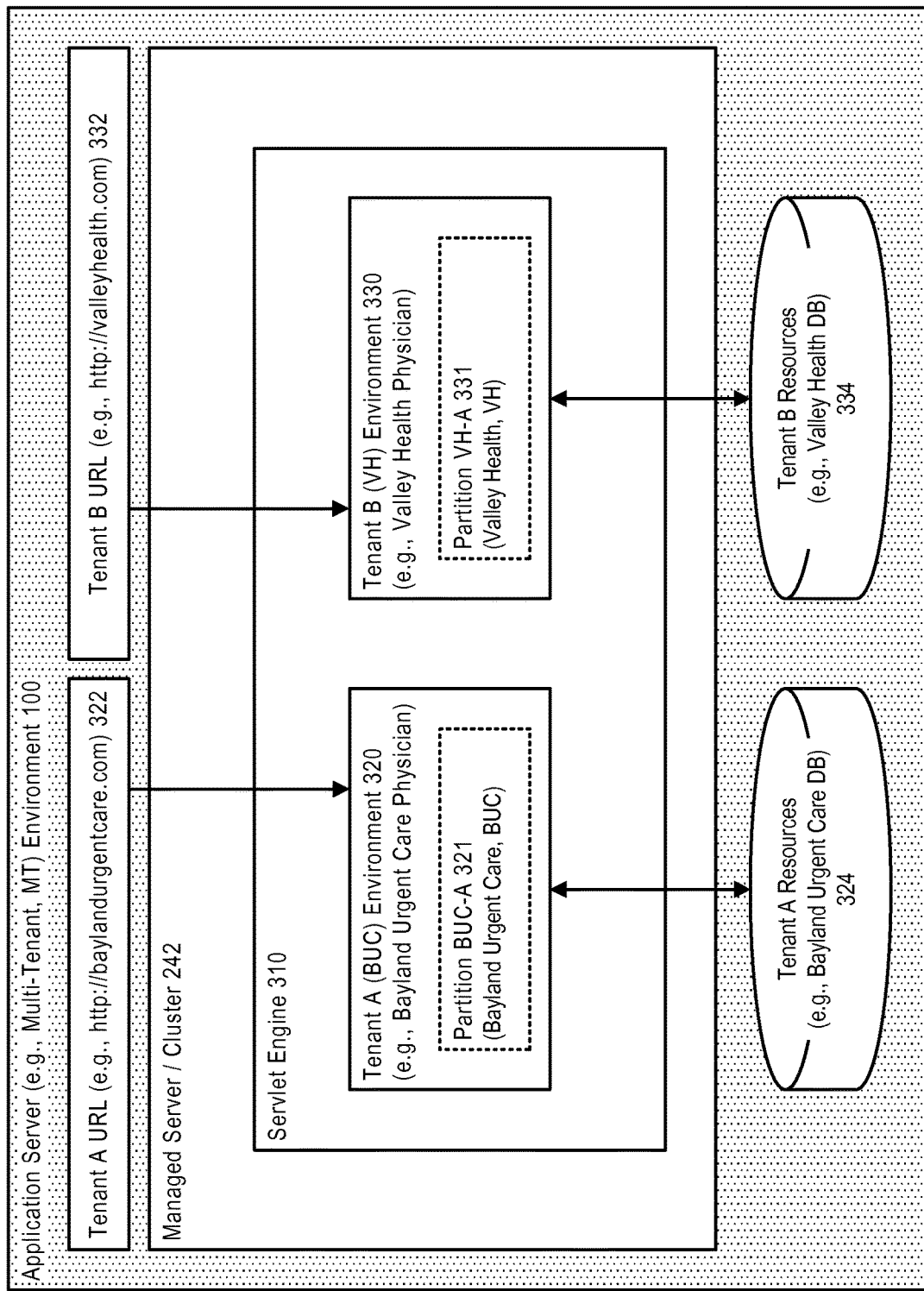
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland Urgent Care database, or a Valley Health database respectively. The database instances can use compatible schemas, since the same application code will execute against both databases. When the system starts the partitions, it can create the virtual targets and connection pools to the respective database instances.

Transactional Environment and Global Transaction

Figure 6:
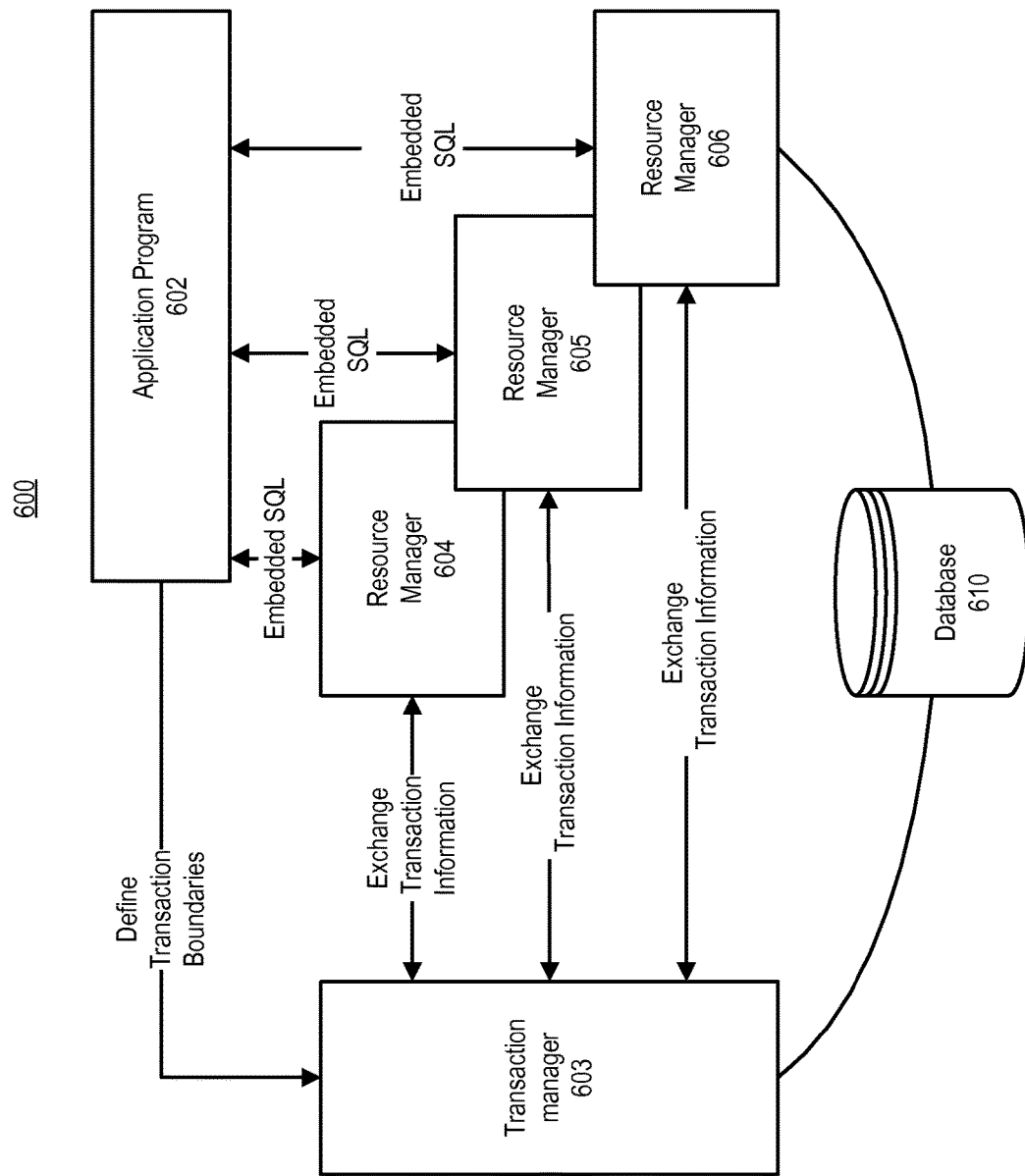
FIG. 6 shows an illustration of a transactional environment, in accordance with an embodiment of the invention.

FIG. 6 shows an illustration of a transactional environment, in accordance with an embodiment of the invention. As shown in FIG. 6, a transactional environment 600 can include an application program 602, one or more transaction managers (TM) 603, a plurality of resource managers (RM) 604-606, and one or more persistence stores, e.g. the database 610.

In accordance with an embodiment, the application program 602 can specify actions that constitute a transaction. As illustrated, the application program 602 communicates with the transaction manager 603 to begin, commit, or abort a transaction, and the transaction manager 603 can send back the start, end and disposition of the transaction to the application program 602. Furthermore, the application program 602 can define transaction boundaries for the transaction manager 603, which can exchange transaction information with the plurality of resource managers (RM) 604-606. In addition, the application program 602 can communicate with the plurality of resource managers 604-606 via Embedded Structured Query (SQL) to do work.

The plurality of resource managers 604-606 can provide access to persistence stores, e.g. the database 610 (or databases). In accordance with an embodiment of the invention, the plurality of resource managers 604-606 can implement XA (eXtended Architecture) interfaces to handle database connections and disconnections transparently to persistence stores. The XA interfaces can be based on a specification that describes a protocol for transaction coordination, commitment, and recovery. An XA resource participating in a transaction can comprise an XA resource manager and a backend persistence store.

In accordance with various embodiments of the invention, a transactional system can support a global transaction, which can be executed on more than one server, and is capable of accessing data from more than one resource manager.

A global transaction can be treated as a specific sequence of operations that are characterized by four properties, namely atomicity, consistency, isolation, and durability (ACID). The global transaction can be a logical unit of work where all portions of the transaction either succeed or have no effect. As well, operations are performed that correctly transform the resources from one consistent state to another. Additionally, within a global transaction, intermediate results are not generally accessible to other transactions, although other processes in the same transaction may access the data. As well, effects of a completed sequence of a global transaction are not generally altered by failure.

Furthermore, a global transaction, in accordance with an embodiment, may include several local transactions, each accessing a single resource manager. A local transaction can access a single database or file and can be controlled by the resource manager responsible for performing concurrency control and atomicity of updates at that distinct database. A given local transaction may be either successful or unsuccessful in completing its access.

In accordance with an embodiment, the transaction manager 603 can assign global transaction identifiers (GTRIDs) to the different transactions in transactional environment 600. The transaction manager 603 can monitor the progress of the transaction, and take responsibility for ensuring transaction completion and providing failure recovery. In addition, the transaction manager 603 can communicate with the plurality of resource managers 604-605 via XA interfaces to exchange transaction information, such as sending two-phase commits calls to the resource managers 604-605.

Two-phase Commit (2PC)

A two-phase-commit (2PC) protocol can be used to execute a transaction, such as a loosely-coupled global transaction. The two-phase-commit protocol (2PC) can include a prepare phase and a commit phase. In the prepare phase, a coordinating transaction manager (TM) instructs the participating resource managers (RMs) to take the necessary steps for either committing or aborting the transaction. In the commit phase, the transaction manager (TM) decides whether to commit or abort the transaction, based on the results of the prepare phase.

Figure 7:
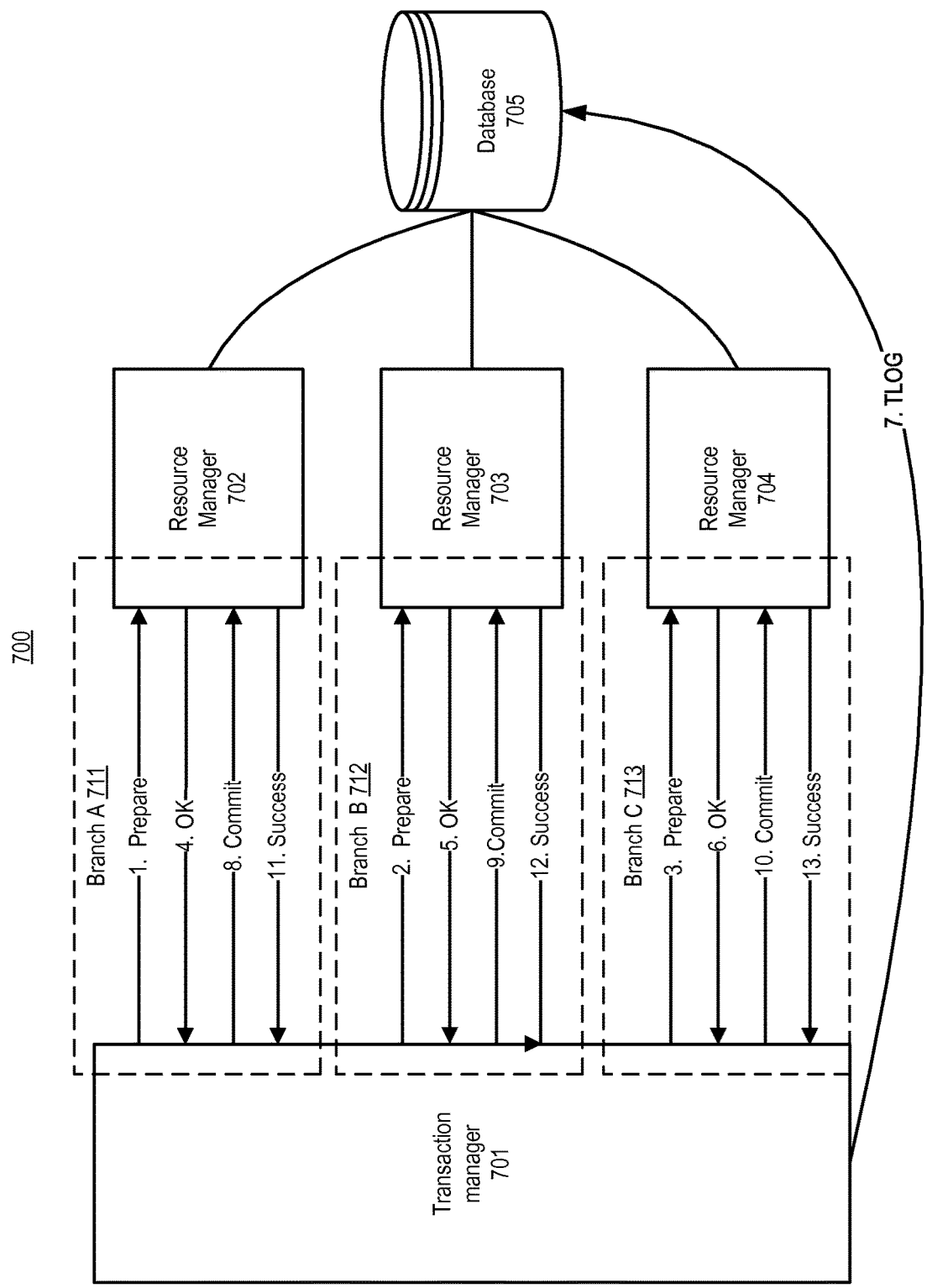
FIG. 7 shows an illustration of supporting two-phase commit in a transactional middleware machine environment.

FIG. 7 shows an illustration of supporting two-phase commit in a transactional middleware machine environment. As shown in FIG. 7, a transactional environment 700 can include a transaction manager 701 that supports the execution of various transactions, and one or more resource managers 702-704 that manage one or more data sources, e.g. a database 705.

For example, the transaction manager 701 can execute a transaction that involves transaction branch A 711, transaction branch B 712, and transaction branch C 713, each of which can be executed against a resource manager 702-704 respectively. If any branch fails in the transaction, the transaction manager 701 can help the resource manager 702-704 decide whether to commit, or roll back, the transaction.

As shown in FIG. 7, the transaction manager 701 can send a prepare instruction to the resource manager 702-704 on all three branches (steps 1, 2, and 3). After the resource managers 702-704 return an "OK" vote (steps 4, 5 and 6), the transaction manager 701 can write a transaction log (TLOG) to the database 705 (step 7).

The transaction log may be written either to files, or to a database, so that the transaction manager 701 can have enough information to recover the transaction if any branch fails during the commit phase.

Then, the transaction manager 701 can instruct the resource manager 702-704 to commit all three branches (steps 8, 9 and 10). The resource manager 702-704 can inform the transaction manager 701 after successfully completing the commit phase (steps 11, 12 and 13).

Supporting Transactions in a Multitenant Application Server Environment

Figure 8:
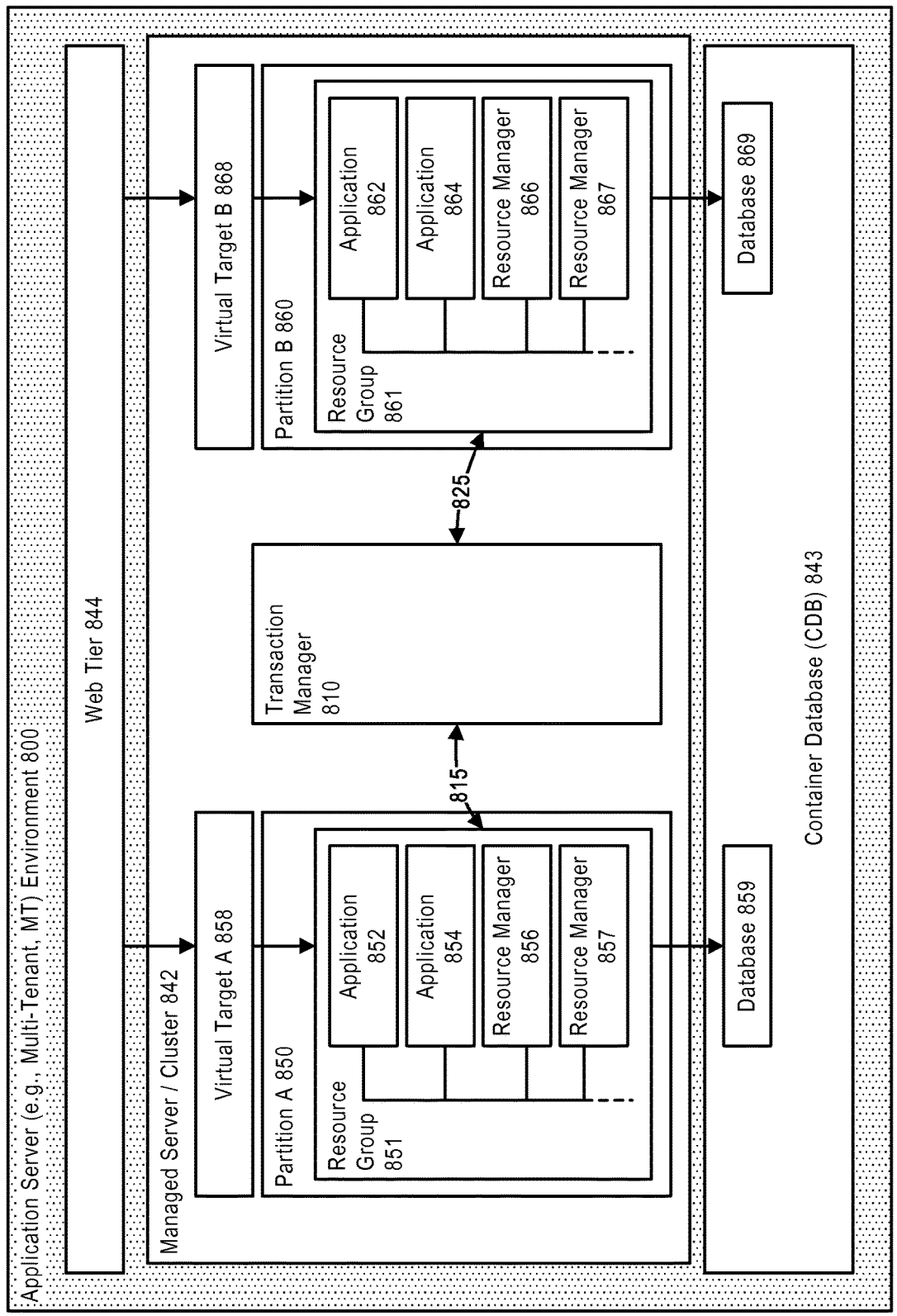
FIG. 8 is an illustration of transaction support in a multitenant application server environment, according to an embodiment.

FIG. 8 is an illustration of transaction support in a multitenant application server environment, according to an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 842, or a similar environment which can provide access to a CDB 843, and which are accessible via a web tier 844. This allows, for example, a domain or partition to be associated with one or more of the PDBs (of the CDB).

In accordance with an embodiment, each of the plurality of partitions, in this example partition A 850 and partition B 860, can be configured to include a plurality of resources associated with that partition. For example, partition A can be configured to include a resource group 851 which can contain, for example, application 852, application 854, resource manager 856, and resource manager 857, which can be associated with one or more databases, for example, database 859, wherein the partition is accessible via a virtual target A 858. Similarly, partition B can be configured to include a resource group 861 which can contain, for example, application 862, application 864, resource manager 866, and resource manager 867, which can be associated with one or more databases, for example, database 869, wherein the partition is accessible via a virtual target B 868.

In accordance with an embodiment, the system can also contain a transaction manager 810, which can, upon a call from, for example, an application, manage a transaction 815 associated with resource group 851, which is associated with partition A 850. The transaction manager can similarly manage a transaction 825 associated with resource group 861, which is associated with partition B 860.

In accordance with an embodiment, there can be exactly one transaction manager per domain in a multitenant application server environment.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Partition JTA (Java Transaction API) Configuration MBeans

Figure 9:
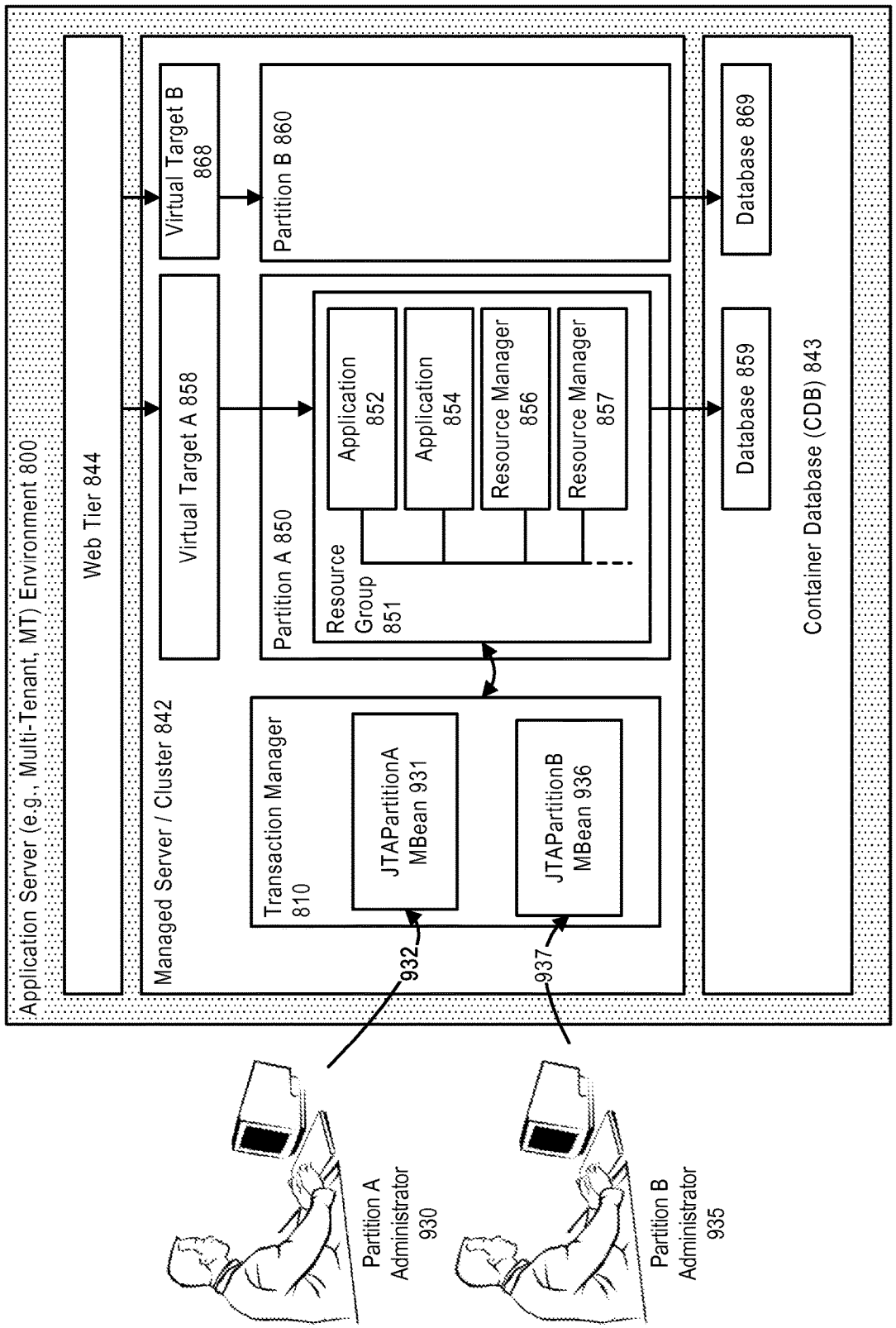
FIG. 9 is an illustration of transaction support in a multitenant application server environment, according to an embodiment.

FIG. 9 is an illustration of transaction support in a multitenant application server environment, according to an embodiment. More specifically, FIG. 9 depicts partition configuration of a transaction within a multitenant application server environment.

In accordance with an embodiment, a plurality of partitions can be executed within a managed server/cluster 842, or a similar environment which can provide access to a CDB 843, and which are accessible via a web tier 844. This allows, for example, a domain or partition to be associated with one or more of the PDBs (of the CDB).

In accordance with an embodiment, each of the plurality of partitions, in this example partition A 850 and partition B 860, can be configured to include a plurality of resources associated with that partition. For example, partition A can be configured to include a resource group 851 which can contain, for example, application 852, application 854, resource manager 856, and resource manager 857, which can be associated with one or more databases, for example, database 859, wherein the partition is accessible via a virtual target A 858. Similarly, partition B can be configured to include a resource group 861 which can contain, for example, application 862, application 864, resource manager 866, and resource manager 867, which can be associated with one or more databases, for example, database 869, wherein the partition is accessible via a virtual target B 868.

In accordance with an embodiment, the system can also contain a transaction manager 810, which can, upon a call from, for example, an application, manage a transaction associated with resource group 851, which is associated with partition A 850. The transaction manager can similarly manage a transaction associated with resource group 861, which is associated with partition B 860.

In accordance with an embodiment, there can be one transaction manager per domain in a multitenant application server environment.

In accordance with an embodiment, a partition administrator, such as partition A administrator 930 and/or partition B administrator 935, can configure certain aspects of a transaction by configuring a JTAPartitionMBean, such as JTAPartitionAMBean 931 and JTAPartitionBMBean 936.

As depicted in FIG. 9, in accordance with an embodiment, partition A administrator 930 can set, for example, the transaction timeout time (e.g., in seconds) for the transaction associated with partition A by configuring 932 JTAPartitionAMBean 931 to include a different transaction timeout time than the default set by the domain level JTAMBean. Additionally, not shown in FIG. 9, partition B administrator 935 can, likewise, set a different transaction timeout time for a transaction associated with partition B by configuring 937 JTAPartitionBMBean 936.

For example, partition A administrator can determine that the default transaction timeout time is too short for the physical, geographically diverse resources that are involved with partition A's transaction. Knowing this, partition A administrator can, by configuring the JTAPartitionAMbean, override the default transaction timeout time and set a longer transaction timeout time.

In accordance with an embodiment, a JTAPartitionMBean can be obtained from a PartitionMBean, such as, for example:

```
DomainMBean
  +PartitionMBean
    +JTAPartitionMBean
```

In accordance with an embodiment, a JTAPartitionMBean can be related to a configuration MBean, and can allow for access to and configuration of certain aspects of a transaction. In accordance with an embodiment, the partition-level JTAPartitionMBean allows access to and configuration of a lesser amount of aspects of a transaction than those accessible by a domain-level JTAMBean. For example, in certain embodiments, a partition administrator can only access and configure, via the JTAPartitionMBean, a transaction timeout configuration. In certain other embodiments, in addition to being allowed access to configuration the transaction timeout configuration, a partition administrator can, via the JTAPartitionMBean, view an array of determine resources and set the determiner resources and/or determiner resource managers for certain transactions. For example:

```
public interface JTAPartitionMBean extends ConfigurationMBean {
  /**
    * <p>Specifies the maximum amount of time, in seconds, an active
    * transaction is allowed to be in the first phase of a two-phase
    * commit transaction. If the specified amount of time expires, the
    * transaction is automatically rolled back.</p>
    *
    * @return Transaction timeout in seconds.
    * @default 30
    */
  int getTimeoutSeconds( );
  /**
    * <p>Sets the value of the TimeoutSeconds attribute.</p>
    *
    * @see #getTimeoutSeconds
    * @param timeout Transaction timeout in seconds.
    * @exception InvalidAttributeValueException
    * @exception DistributedManagementException
    * @dynamic
    * @legalMin 1
    * @legalMax java.lang.Integer.MAX_VALUE
    */
  void setTimeoutSeconds(int timeout)
    throws InvalidAttributeValueException,
  DistributedManagementException ;
  /**
    * <p>Specifies a list of one or more transaction resources
    * (determiners) separated by \ line breaks.
    * A determiner's in-doubt transaction accords are used during
    * transaction recovery\when a TLog is not present.</p>
    *
    * @return The determiners value
    * @configurable
    * @dynamic
    * @include-api for-public-api
    */
  String[ ] getDeterminers( );
  /**
    * <p>Sets the value of the Determiners attribute.</p>
    *
    * @see #getDeterminers
    * @param names The new determiners value
    * @exception InvalidAttributeValueException
    * @dynamic
    * @include-api for-public-api
    */
  void setDeterminers(String[ ] names)
    throws InvalidAttributeValueException;
  /**
    * <p>Returns a list of one or more transaction resources
    * (determiners).
    * A determiner's in-doubt transaction records are used during
    * transaction recovery when a TLog is not present.</p>
    *
    * @return The ArrayList of DeterminerCandidateResourceInfo objects,
    * candidate determiners resources
    * @transient
    * @exclude
    * @internal
    * @non-configurable
    */
  ArrayList<DeterminerCandidateResourceInfo>
```

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Partition JTA Runtime MBeans

Figure 10:
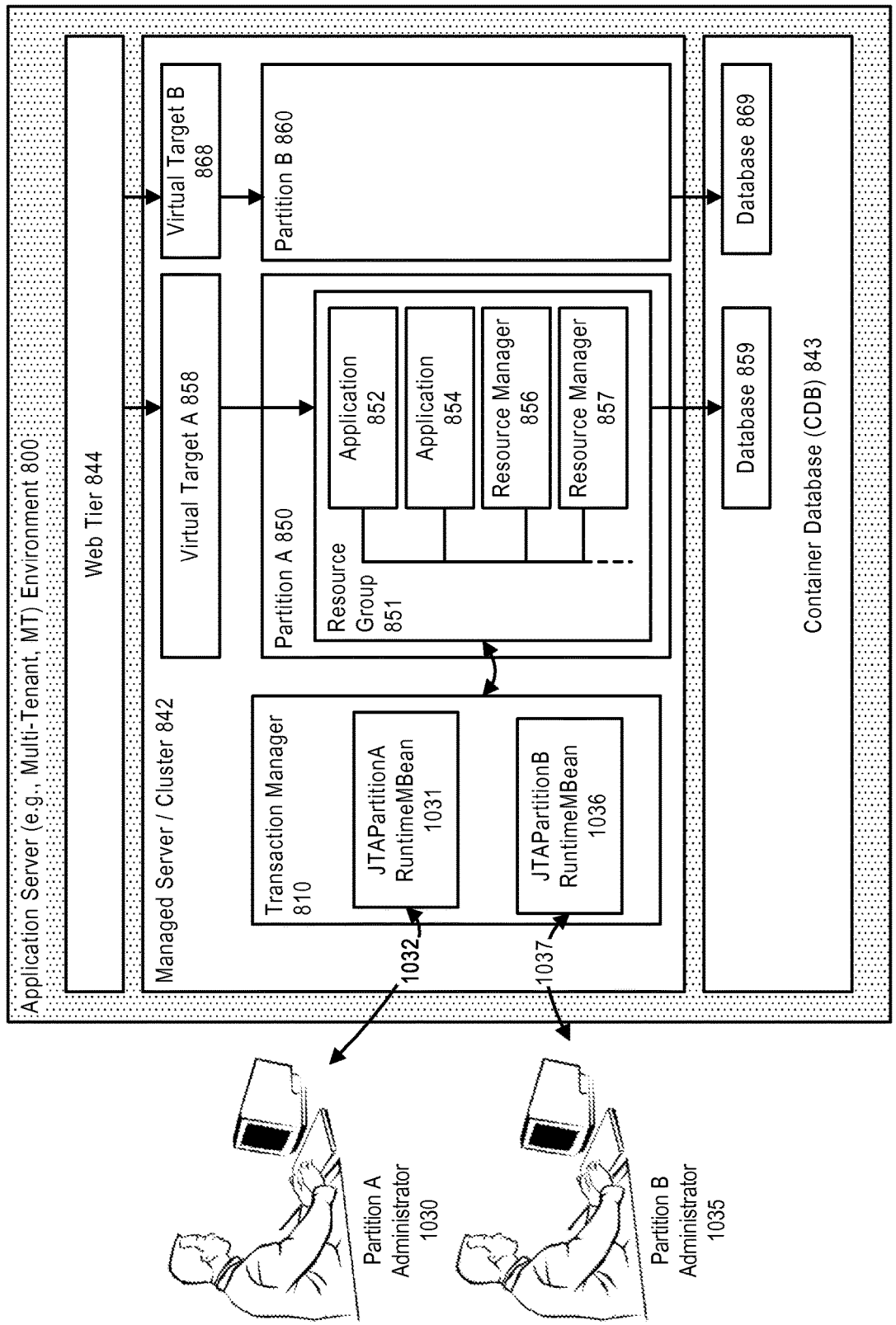
FIG. 10 is an illustration of transaction support in a multitenant application server environment, according to an embodiment.

FIG. 10 is an illustration of transaction support in a multitenant application server environment, according to an embodiment. More specifically, FIG. 10 depicts partition runtime monitoring of a transaction within a multitenant application server environment.

In accordance with an embodiment, a plurality of partitions can be executed within a managed server/cluster 842, or a similar environment which can provide access to a CDB 843, and which are accessible via a web tier 844. This allows, for example, a domain or partition to be associated with one or more of the PDBs (of the CDB).

In accordance with an embodiment, each of the plurality of partitions, in this example partition A 850 and partition B 860, can be configured to include a plurality of resources associated with that partition. For example, partition A can be configured to include a resource group 851 which can contain, for example, application 852, application 854, resource manager 856, and resource manager 857, which can be associated with one or more databases, for example, database 859, wherein the partition is accessible via a virtual target A 858. Similarly, partition B can be configured to include a resource group 861 which can contain, for example, application 862, application 864, resource manager 866, and resource manager 867, which can be associated with one or more databases, for example, database 869, wherein the partition is accessible via a virtual target B 868.

In accordance with an embodiment, the system can also contain a transaction manager 810, which can, upon a call from, for example, an application, manage a transaction associated with resource group 851, which is associated with partition A 850. The transaction manager can similarly manage a transaction associated with resource group 861, which is associated with partition B 860.

In accordance with an embodiment, there can be exactly one transaction manager per domain in a multitenant application server environment.

In accordance with an embodiment, a partition administrator, such as partition A administrator 1030 and/or partition B administrator 1035, can monitor certain aspects of a transaction by accessing a JTAPartitionRuntimeMBean, such as JTAPartitionARuntimeMBean 1031 and JTAPartitionBRuntimeMBean 1036.

As depicted in FIG. 10, in accordance with an embodiment, partition A administrator 1030 can monitor, for example, certain aspects and statistics of a transaction associated with partition A 850 and being managed by transaction manager 810 by accessing 1032 JTAPartitionARuntimeMBean 1031. Similarly, although not depicted in FIG. 10, partition B administrator 1035 can monitor, for example, certain aspects and statistics of a transaction associated with partition B 860 and being managed by transaction manager 810 by accessing 1037 JTAPartitionBRuntimeMBean 1036. Importantly, partition A administrator cannot access statistics for applications associated with partitions other than partition A, and the same holds true for partition B.

In accordance with an embodiment, JTA can create a sub-tree of JTA runtime mbeans that can be parented by the ServerRuntimeMBean. A subset of JTA runtime mbean can be created for each partition in a domain, under the respective PartitionRuntimeMBeans. Here is an exemplary mbean tree structure:

```
ServerRuntimeMBean
  + PartitionRuntimeMBean[ ]
    + JTAPartitionRuntimeMBean
      + TransactionNameRuntimeMBean
```

In accordance with an embodiment, here is an example of a diagram for super/child relationship of JTAParititonRuntimeMBean:

```
RuntimeMBean
  + JTAStatisticsRuntimeMBean extends RuntimeMBean
    + JTATransactionStatisticsRuntimeMBean extends JTAStatisticsRuntime-Bean
      + JTAPartitionRuntimeMBean extends JTATransactionStatisticsRuntimeMBean
```

In accordance with an embodiment, here is an exemplary output from a partition runtime mbean, via, for example, a scripting tool, such as WebLogic Scripting Tool:

```
wls:/partitionDomain/serverRuntime/PartitionRuntimes/p1/
JTAPartitionRuntime/JTAPartitionRuntime> 1s( )
dr-- NonXAResourceRuntimeMBeans
dr-- RecoveryRuntimeMBeans
dr-- TransactionLogStoreRuntimeMBean
dr-- TransactionNameRuntimeMBeans
dr-- TransactionResourceRuntimeMBeans
-r-- ActiveTransactionsTotalCount 0
-r-- HealthState
Component:JTA,State:HEALTH_OK,MBean:JTARuntime,
ReasonCode:[ ]
-r-- JTATransactions null
-r-- Name JTARuntime
-r-- RegisteredNonXAResourceNames null
-r-- RegisteredResourceNames
java.lang.String[WSATGatewayRM_admin_TxTestDomain]
-r-- SecondsActiveTotalCount 0
-r-- TransactionAbandonedTotalCount 0
-r-- TransactionCommittedTotalCount 0
-r-- TransactionHeuristicsTotalCount 0
-r-- TransactionLLRCommittedTotalCount 0
-r-- TransactionNoResourcesCommittedTotalCount 0
-r-- TransactionOneResourceOnePhaseCommittedTotalCount0
-r-- TransactionReadOnlyOnePhaseCommittedTotalCount0
-r-- TransactionRolledBackAppTotalCount 0
-r-- TransactionRolledBackResourceTotalCount 0
-r-- TransactionRolledBackSystemTotalCount 0
-r-- TransactionRolledBackTimeoutTotalCount 0
-r-- TransactionRolledBackTotalCount 0
-r-- TransactionTotalCount 0
-r-- TransactionTwoPhaseCommittedTotalCount 0
-r-- Type JTARuntime
-r-x forceGlobalCommit Void : javax.transaction.xa.Xid
-r-x forceGlobalRollback Void : javax.transaction.xa.Xid
-r-x forceLocalCommit Void : javax.transaction.xa.Xid
-r-x forceLocalRollback Void : javax.transaction.xa.Xid
-r-x getJTATransaction
weblogic.management.runtime.JTATransaction : String(xid)
-r-x getRecoveryRuntimeMBean WebLogicMBean : String(serverName)
-r-x getTransactionsOlderThan
weblogic.management.runtime.JTATransaction[ ] : Integer(seconds)
```

In accordance with an embodiment, a JTA partition runtime mbean can manage JTA partition related runtime mbean. JTA partition runtime mbean can be used for the partition level, whereas JTA runtime mbean can be used at the domain level. JTA partition runtime mbean does not extend HealthFeedback, which manages the server level health. For example:

```
public interface JTAPartitionRuntimeMBean
  extends JTATransactionStatisticsRuntimeMBean {
  /**
   * <p>An array of <code>TransactionNameRuntimeMBeans</code> that
   * represent statistics for all transactions in the partition,
   * categorized by transaction name. </p>
   *
   * @see weblogic.management.runtime.TransactionNameRuntimeMBean
   * @return The transactionNameRuntimeMBeans value
```

```
 * @exception RemoteException
 */
TransactionNameRuntimeMBean[ ] getTransactionNameRuntimeMBeans( ) throws
RemoteException;
   /**
    * @exclude
    * @internal
    * @non-configurable
    */
boolean addTransactionNameRuntimeMBean(TransactionNameRuntimeMBean b);
   /**
    * @exclude
    * @internal
    * @non-configurable
    */
boolean removeTransactionNameRuntimeMBean(TransactionNameRuntimeMBean
b);
   /**
    * <p>The number of active transactions on the server.</p>
    *
    * @return The activeTransactionsTotalCount value
    */
int getActiveTransactionsTotalCouht( );
   /**
    * <p>An array of <code>TransactionResourceRuntimeMBeans</code>
    * that each represents the statistics for a transaction
    * resource.</p>
    *
    * @see weblogic.management.runtime.TransactionResourceRuntimeMBean
    * @return The transactionResourceRuntimeMBeans value
    * @exception RemoteException
    * @include-api for-public-api
    */
TransactionResourceRuntimeMBean[ ]getTransactionResourceRuntimeMBeans( )
throws RemoteException;
   /**
    * @exclude
    * @internal
    * @non-configurable
    */
   boolean addTransactionResourceRuntimeMBean-
(TransactionResourceRuntimeMBean b);
   /**
    * @exclude
    * @internal
    * @non-configurable
    */
   boolean removeTransactionResourceRuntimeMBean-
(TransactionResourceRuntimeMBean b);
   /**
    * <p>An array of <code>NonXAResourceRuntimeMBeans</code> that each
    * represents the statistics for a non-XA resource.</p>
    *
    * @see weblogic.management.runtime.NonXAResourceRuntimeMBean
    * @return The nonXAResourceRuntimeMBeans value
    * @exception RemoteException
    * @include-api for-public-api
    */
   NonXAResourceRuntimeMBean[ ] getNonXAResourceRuntimeMBeans( ) throws
RemoteException;
   /**
    * @exclude
    * @internal
    * @non-configurable
    */
boolean addNonXAResourceRuntimeMBean(NonXAResourceRuntimeMBean b);
   /**
    * @exclude
    * @internal
    * @non-configurable
    */
boolean removeNonXAResourceRuntimeMBean(NonXAResourceRuntimeMBean b);
   /**
    * <p>An array of <code>JTATransaction</code> objects. Each object
    * provides detailed information regarding an active transaction that
    * has existed for a period longer than the time specified. </p>
    *
    * @param seconds The transaction duration in seconds qualifier.
    * @return The transactionsOlderThan value
```

```
    * @rolePermitAll
    * @excludeFromRest No default REST mapping for JTATransaction
    * @include-api for-public-api
    */
JTATransaction[ ] getTransactionsOlderThan(Integer seconds);
   /**
    * <p>An array of <code>JTATransaction</code> objects. Each object
    * provide detailed information regarding an active transaction</p>
    *
    * @return The jTATransactions value
    * @excludeFromRest No default REST mapping for JTATransaction
    * @include-api for-public-api
    */
JTATransaction[ ] getJTATransactions( );
   /**
    * <p>An array of XA resource names that are registered with the
    * transaction manager.</p>
    *
    * @return The registeredResourceNames value
    * @include-api for-public-api
    */
String [ ] getRegisteredResourceNames( );
   /**
    * <p>An array of NonXA resource names that are registered with the
    * transaction manager.</p>
    *
    * @return The registeredNonXAResourceNames value
    * @include-api for-public-api
    */
String[ ] getRegisteredNonXAResourceNames( );
    * @include-api for-public-api
    */
String[ ] getRegisteredNonXAResourceNames( );
```

Figure 11:
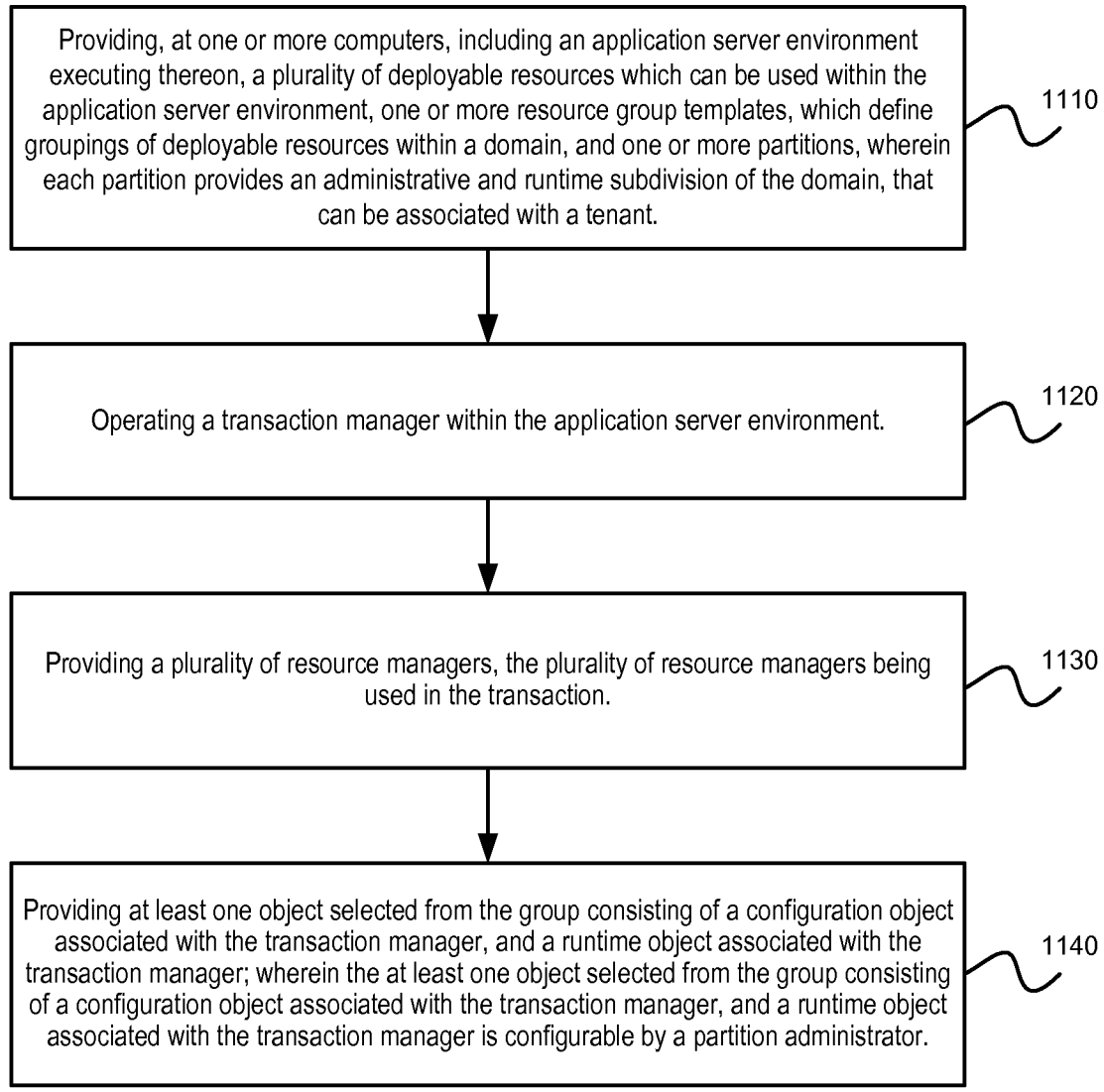
FIG. 11 is an illustrative flow chart of transaction support in a multitenant application server environment, in accordance with an embodiment.

FIG. 11 is an illustrative flow chart of transaction support in a multitenant application server environment, in accordance with an embodiment. As shown in FIG. 11, at step 1110, the method can provide, at one or more computers, including an application server environment executing thereon, a plurality of deployable resources which can be used within the application server environment, one or more resource group templates, which define groupings of deployable resources within a domain, and one or more partitions, wherein each partition provides an administrative and runtime subdivision of the domain, that can be associated with a tenant.

At step, 1120, the method can, as described above, operate a transaction manager within the application server environment.

At step 1130, the method can provide a plurality of resource managers, where the plurality of resource managers are also used in the transaction.

At step 1140, the method can provide at least one object selected from the group consisting of a configuration object associated with the transaction manager, and a runtime object associated with the transaction manager; wherein the at least one object selected from the group consisting of a configuration object associated with the transaction manager, and a runtime object associated with the transaction manager is configurable by a partition administrator.

Validation for MBean—Determiner

In accordance with an embodiment, determiners of a datasource for a partition can be configured from an administration console. A partition administrator can define a global level datasource as a determiner of a transaction. As well, a partition administrator can define its own partition level datasource as a determiner. In the event where a partition administrator utilizes a console to select a determiner, the console can display to the partition administrator a list of domain-level resources and partition-level resources available to be selected as a determiner.

JTA Partition Service

In accordance with an embodiment, a JTA partition service can instantiated from aTransactionService.init( ). The JTA partition service can manage the JTA partition runtime mbeans, such as adding and removing JTA partition runtime mbeans. In situations where there are no partitions running (such as during startup before the partitions come online), the JTA partition service can set listeners to look for active partitions. When the active partition are found by the JTA partition service, the JTA partition service can, for example, create JTA runtime mbeans for those active partitions. Later, when the server lifecycle is changed, the JTA partition service can change the JTA partition lifecycle if necessary.

Resource Group Migration

In accordance with an embodiment, the present disclosure can provide for at least two methods in situations where a resource group is migrated from, for example, one server to another server. As already discussed above, a resource group can include various applications and resources, which are both used in the context of transactions.

In accordance with an embodiment, in situations where a resource group is to be migrated or moved, a grace period can be provided via, for example, an interceptor that can provide a grace period for any transactions involving the migrating resource group to finish before the resource group is moved. In the event that that the grace period is insufficient to allow for current transactions to complete before the resource group migration, additional time can be added to the grace period.

In accordance with an embodiment, in situations where a resource group is to be migrated or moved, the transaction manager can determine where the resource group has migrated and, subsequently, complete the transactions that were active before the migration. The transaction manager can determine the new location of the resource group by utilizing at least one of two methods. First, the transaction manager can determine if any other transactions have utilized the migrated resource group, and, upon the determination of such subsequent transactions, determine the location of the migrated resource group and then complete any transactions that were pending prior to the migration. Second, the transaction manager can search a list of servers in the domain to determine the location of the migrated resource group.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting a transaction in a multitenant application server environment, comprising:
   one or more computers, including an application server for deployment and execution of software applications, wherein the application server is associated with a domain configuration that is used at runtime to define a domain for execution of the software applications, and
      a plurality of partitions, wherein each of the plurality of partitions is associated with a partition configuration, wherein each partition provides a subdivision of the domain and includes one or more resource groups of a plurality of resource groups, and wherein each partition is associated with a tenant of a plurality of tenants;
   one transaction manager operating in the application server, the transaction manager performing a first two-phase commit transaction with a resource manager of a first resource group of a first partition of the plurality of partitions and a second two-phase commit transaction with a resource manager of a second resource group of a second partition of the plurality of partitions, wherein each two-phase commit transaction comprises a prepare phase and a commit phase, the commit phase being dependent on a result of the associated prepare phase;
   a plurality of configuration objects associated with the transaction manager; and
   a plurality of runtime objects associated with the transaction manager;
   wherein a first configuration object associated with the transaction manager and a first runtime object associated with the transaction manager are configured according to a first set of instructions received from an administrator of the first partition at the application server, wherein the configured first configuration object sets a first timeout period for the first two-phase commit transaction with the first resource group of the first partition, wherein access to the first configuration object and the first runtime object is restricted to the administrator of the first partition; and
   wherein a second configuration object associated with the transaction manager and a second runtime object associated with the transaction manager are configured according to a second set of instructions received from an administrator of the second partition at the application server, wherein the configured second configuration object sets a second timeout period for the second two-phase commit transaction involving the second resource group of the second partition, wherein the first timeout period and the second timeout period are different, wherein access to the second configuration object and the second runtime object is restricted to the administrator of the second partition.

2. The system of claim 1, wherein further instructions are received at the application server to further configure the first configuration object to set a determiner resource for the first two-phase commit transaction.

3. The system of claim 2, wherein the first timeout period set by the first configuration object is different from and overrides a default transaction timeout duration set at a global configuration object.

4. The system of claim 2, wherein the determiner resource for the first two-phase commit transaction set by the first configuration object overrides a default determiner resource set at a global configuration object.

5. The system of claim 1, wherein the first configured runtime object associated with the transaction manager provides monitoring statistics associated with the first two-phase commit transaction to the first partition administrator.

6. The system of claim 5, wherein the monitoring statistics provided to the first partition administrator are scoped to the first partition of the plurality of partitions.

7. The system of claim 1, wherein the transaction manager, upon detecting a migration of the first resource group of the first partition of the plurality of partitions to the second partition of the plurality of partitions, provides an interceptor to allow the first two-phase commit transaction to complete before the migration of the resource group.

8. A method for supporting a transaction in a multitenant application server environment, comprising:
   providing, at one or more computers, including an application server for deployment and execution of software applications, wherein the application server is associated with a domain configuration that is used at runtime to define a domain for execution of the software applications, a plurality of partitions, wherein each of the plurality of partitions is associated with a partition configuration, wherein each partition provides a subdivision of the domain and includes one or more resource groups of a plurality of resource groups, and wherein each partition is associated with a tenant of a plurality of tenants;

operating one transaction manager within the application server environment, the transaction manager performing a first two-phase commit transaction with a resource manager of a first resource group of a first partition of the plurality of partitions and a second two-phase commit transaction with a resource manager of a second resource group of a second partition of the plurality of partitions, wherein each two-phase commit transaction comprises a prepare phase and a commit phase, the commit phase being dependent on a result of the associated prepare phase;

providing a plurality of configuration objects associated with the transaction manager and a plurality of runtime objects associated with the transaction manager;

configuring, according to a first set of instructions received from an administrator of the first partition at the application server, a first configuration object associated with the transaction manager and a first runtime object associated with the transaction manager, wherein the configured first configuration object sets a first timeout period for the first two-phase commit transaction with the first resource group of the first partition, wherein access to the first configuration object and the first runtime object is restricted to the administrator of the first partition; and configuring, according to a second set of instructions received from an administrator of the second partition at the application server, a second configuration object associated with the transaction manager and a second runtime object associated with the transaction manager, wherein the configured second configuration object sets a second timeout period for the second two-phase commit transaction involving the second resource group of the second partition, wherein the first timeout period and the second timeout period are different, wherein access to the second configuration object and the second runtime object is restricted to the administrator of the second partition.

9. The method of claim 8, wherein further instructions are received at the application server to further configure the first configuration object to set a determiner resource for the first two-phase commit transaction.

10. The method of claim 9, wherein the first timeout period set by the first configuration object is different from and overrides a default transaction timeout duration set at a global configuration object.

11. The method of claim 9, wherein the determiner resource for the first two-phase commit transaction set by the first configuration object overrides a default determiner resource for the transaction set at a global configuration object.

12. The method of claim 8, wherein the first configured runtime object associated with the transaction manager provides monitoring statistics associated with the first two-phase commit transaction to the first partition administrator.

13. The method of claim 12, wherein the monitoring statistics provided to the first partition administrator are scoped to the first partition of the plurality of partitions.

14. The method of claim 8, wherein the transaction manager, upon detecting a migration of the first resource group of the first partition of the plurality of partitions to the second partition of the plurality of partitions, provides an interceptor to allow the first two-phase commit transaction to complete before the migration of the resource group.

15. A non-transitory computer readable storage medium, including instructions stored thereon for supporting a transaction a multitenant application server environment which when read and executed by one or more computers cause the one or more computers to perform steps comprising:

providing, at one or more computers, including an application server for deployment and execution of software applications, wherein the application server is associated with a domain configuration that is used at runtime to define a domain for execution of the software applications, a plurality of partitions, wherein each of the plurality of partitions is associated with a partition configuration, wherein each partition provides a subdivision of the domain and includes one or more resource groups of a plurality of resource groups, and wherein each partition is associated with a tenant of a plurality of tenants;

operating one transaction manager within the application server environment, the transaction manager performing a first two-phase commit transaction with a resource manager of a first resource group of a first partition of the plurality of partitions and a second two-phase commit transaction with a resource manager of a second resource group of a second partition of the plurality of partitions, wherein each two-phase commit transaction comprises a prepare phase and a commit phase, the commit phase being dependent on a result of the associated prepare phase;

providing a plurality of configuration objects associated with the transaction manager and a plurality of runtime objects associated with the transaction manager;

configuring, according to a first set of instructions received from an administrator of the first partition at the application server, a first configuration object associated with the transaction manager and a first runtime object associated with the transaction manager, wherein the configured first configuration object sets a first timeout period for the first two-phase commit transaction with the first resource group of the first partition, wherein access to the first configuration object and the first runtime object is restricted to the administrator of the first partition; and configuring, according to a second set of instructions received from an administrator of the second partition at the application server, a second configuration object associated with the transaction manager and a second runtime object associated with the transaction manager, wherein the configured second configuration object sets a second timeout period for the second two-phase commit transaction involving the second resource group of the second partition, wherein the first timeout period and the second timeout period are different, wherein access to the second configuration object and the second runtime object is restricted to the administrator of the second partition.

16. The non-transitory computer readable storage medium of claim 15, wherein further instructions are received at the application server to further configure the first configuration object to set a determiner resource for the first two-phase commit transaction.

17. The non-transitory computer readable storage medium of claim 16, wherein the first timeout period set by the first configuration object is different from and overrides a default transaction timeout duration set at a global configuration object.

18. The non-transitory computer readable storage medium of claim 16, wherein the determiner resource for the first two-phase commit transaction set by the first configuration object overrides a default determiner resource for the transaction set at a global configuration object.

19. The non-transitory computer readable storage medium of claim 15, wherein the first configured runtime object associated with the transaction manager provides monitoring statistics associated with the first two-phase commit transaction to the first partition administrator.

20. The non-transitory computer readable storage medium of claim 15, wherein the transaction manager, upon detecting a migration of the first resource group of the first partition of the plurality of partitions to the second partition of the plurality of partitions, provides an interceptor to allow the first two-phase commit transaction to complete before the migration of the resource group.

\* \* \* \* \*